OR 3,273,446

T350/6

SCANNING DEVICE HAVING A CONSTANT LENGTH OPTICAL PATH

Filed Dec. 21, 1962

INVENTORS
WILLIAM E. GOETZ
FRED L. HAJNY
BY Richard H. Smith
AGENT

Sept. 20, 1966 W. E. GOETZ ETAL 3,273,446

SCANNING DEVICE HAVING A CONSTANT LENGTH OPTICAL PATH

Filed Dec. 21, 1962 2 Sheets-Sheet 2

United States Patent Office 3,273,446

Patented Sept. 20, 1966

3,273,446

SCANNING DEVICE HAVING A CONSTANT LENGTH OPTICAL PATH

William E. Goetz and Fred L. Hajny, Endicott, N.Y., assignors to International Business Machines Corporation, New York, N.Y., a corporation of New York Filed Dec. 21, 1962, Ser. No. 246,384
3 Claims. (Cl. 88—1)

This invention relates to a scanning device, and, more particularly, to an optical scanning device suitable for use in an optical character recognition system.

Optical sensing devices have as their basis of operation the transmission of light from a light source to an object to be sensed and thence to some form of photosensing equipment. The sensing function is performed when the illuminated object being sensed modulates the light incident upon it and the photosensing equipment detects the modulations and converts them into data manifestations, usually electrical pulse patterns.

In applying this technique to the recognition of information printed on a document, it has been found most practical to modulate the light by reflecting it from the printed surface of the document. Modulation of the light occurs because of the difference in reflectivity between printed and background areas of the document's surface. Since it is practical to sense only a small portion of the total information on a document at any instant of time, a document is read by sensing, in a set, predetermined pattern, successive small areas of the document's surface. Such a sensing pattern is referred to as a "scan."

One of the problems encountered in optically recognizing printed characters lies in the fact that the sensitivity of photosensing elemnts presently available for use is such that a relatively large amount of light must reach the sensing element in order to insure reliable character recognition. One way to make sure that an adequate amount of light reaches the element is simply to use a large, high intensity light source. However, large, high intensity light sources consume a great deal of power and generate excessive amounts of undesirable heat. It is therefore very desirable to maximize the efficiency with which light is handled within the system so that power consumption and heat generation at the light source is kept to a minimum. In addition, the illumination of the document should be kept uniform for maximum reliability.

One scheme which has been developed for reducing the required size of the light source is to limit the area of the document which is illuminated to only that area which is, at any given instant, actually under observation at the photosensing element. Such a technique is herein referred to as "scan illumination" since the area of illumination must be moved across the surface of the document in precise coordination with the scanning movement of the sensing equipment.

Heretofore, devices utilized for scan illuminating the document have included a stationary light source, a scanning mirror and a lens system. The lens system is used to focus light from the source onto a small area on the surface of the document. The scanning mirror is placed in the light path between the lens system and the document and is driven in conjunction with the sensing scanner to move the point of incidence of light on the document through the proper pattern.

While scan illumination is a desirable means for reducing the size of the light source, the above-suggested apparatus for producing scan illumination has several drawbacks. First, the use of a lens system for relaying light from the source to the document interposes a plurality of energy-dispersing refraction surfaces into the optical path of the system and thus reduces the amount of light ultimately reaching the photosensing element. In this connection it is known that up to twenty percent of incident light energy is dissipated when light passes through a refraction surface or reflects from a reflection surface. Thus it can be seen that a simple double lens system, having four refraction surfaces, significantly impairs the optical efficiency of the apparatus. A second drawback is that restrictions on the focal length and aperture size of a lens system cut down the percentage of the total light generated at the source which can be gathered and channeled to the surface of the document. That is, the lens system has to be spaced a relatively large distance from the light source and thus subtends a relatively small segment of the total light energy emanating in all directions from the light source. This decreases the efficiency with which the light is utilized within the system. Third, the insertion of a scanning mirror into the optical path between the lenses and the document adds another energy-dissipating surface with concomitantly adverse results.

Thus it is observed that while the introduction of the teachniques of scan sensing and scan illumination have brought about a general increase in the optical efficiency of character recognition systems, the presence of a lens system between the light source and document and the presence of a scanning mirror in the optical path between the light source and the document substantially reduces the maximum optical efficiency obtainable through the use of scanning techniques.

It is therefore an object of this invention to provide a more efficient optical scanning device employing both scan illumination and scan sensing.

Another object is to provide scan illumination without the use of either a mirror or a conventional lens system interposed between the light source and the surface being scanned.

Still another object is to provide an optical scanning device which requires only a low power light source.

In accordance with the present invention there is provided a light source having a compact filament or arc, the source itself being moved relative to a surface in order to scan illuminate that surface. In addition, a totally internally reflective light-channeling means employing only two refraction surfaces is used to direct a high percentage of the light energy generated at the light source to the surface of the document.

Application of the foregoing principles results in a scanning apparatus which is simple and compact. Additional benefits result from the fact that the scanning apparatus of the present invention is constructed so that the optical distances between the light source and the surface of the document and between the document and the photosensitive element are the same length at all times during the scan. This results in a constant level of illumination at the surface of the document throughout the scan and thus acts to increase reliability of operation of the character recognition system.

The foregoing and other objects, features and advantages of the invention will be apparent from the following more particular description of a preferred embodiment of the invention, as illustrated in the accompanying drawings.

In the drawings:

FIG. 1 is a perspective view of the various elements of the scanning system of the present invention. Portions of some of the elements have been cut away for a clearer illustration of the basic features of the invention. It is to be noted that because of space limitations on the drawing the optical path of the system is broken into two sections which are joined by a curved, dashed arrow to indicate that in actuality the two sections are continuous.

Figure 1:
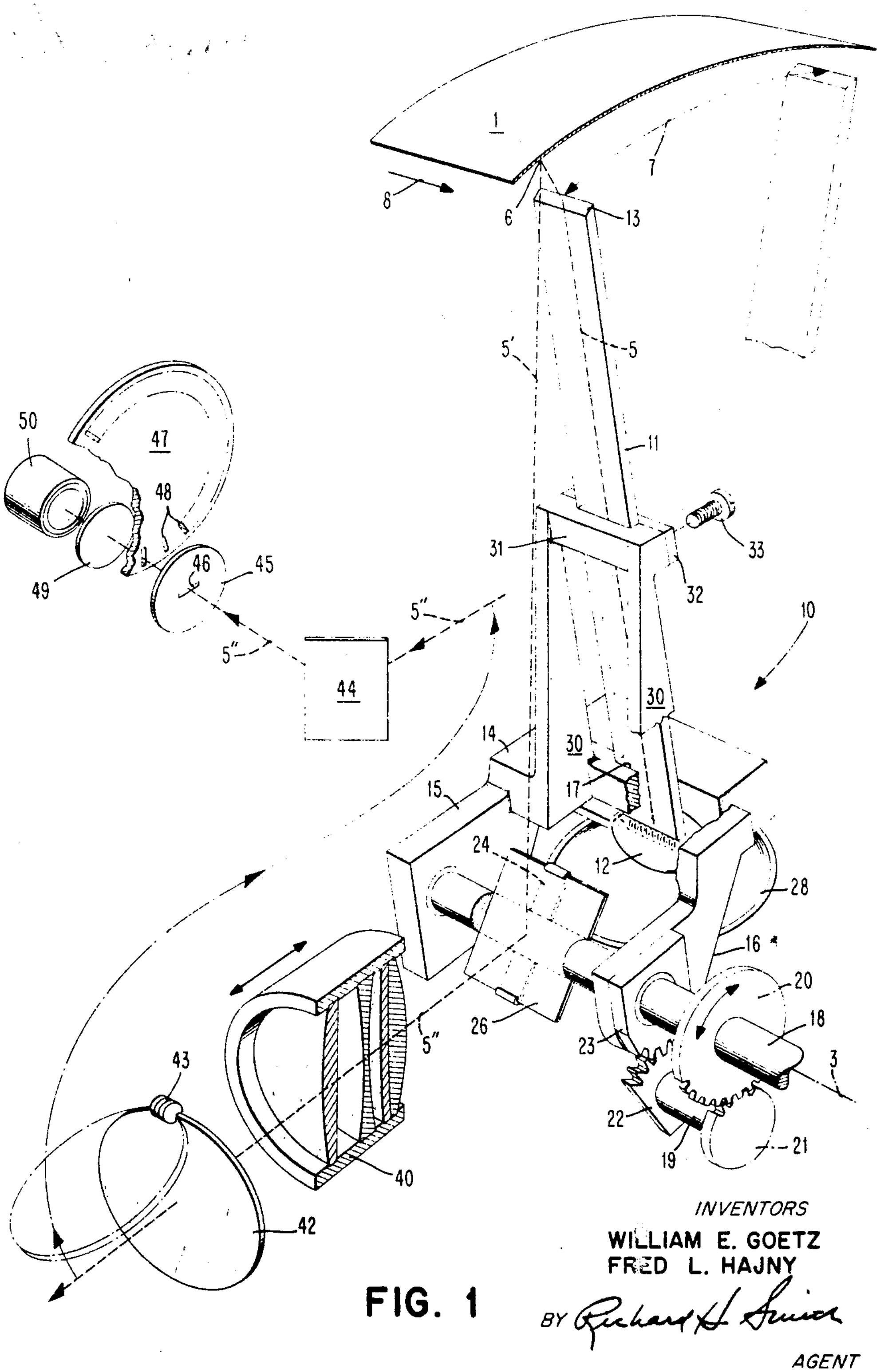

With reference now to FIG. 1 a general description of a character recognition system within which the scanning device of the present invention may be employed will be given. A document 1 is fed in the direction of arrow 8 across an arcuate transparent support window (not shown) with its information-bearing side adjacent the window. The scanning device 10, which will subsequently be described in full detail, is mounted beneath the window and is adapted to oscillate about the center line 3 of a shaft 18. For the purposes of this general description the scanning device includes a light transmitting rod 11 and a light source 12. Light from the source 12 is channeled by the rod 11 to a point close to the surface of the document 1. Light passing through end surface 13 illuminates a portion of the document surface. As the scanning device oscillates, output end surface 13 moves back and forth through an arc 7. A plane mirror 26 is mounted on the shaft 18 and is adapted to oscillate in conjunction with the light transmitting rod 11 so that light reflected from the illuminated portion of the surface of the document is directed to a lens system 40.

The lens system 40 is arranged to focus the light reflected from the surface of the document onto a slit 46 in a fixed mask 45. A chopper disc 47 having a plurality of radial slots 48 is mounted adjacent the mask 45 and serves to dissect the image into small segments. Light passing through slots 48 is focused by a collective lens 49 onto the photosensitive element of a photocell 50. For the purposes of describing the present invention, it is not necessary to describe the photosensing equipment in detail. Any of the well-known apparatus and character recognition techniques which are presently employed in character recognition systems may be used with the present invention to process the signals produced by the photocell 50.

As shown in FIG. 1 the lens system 40 is axially adjustable. In connection with this, a correction lens 42 is adapted to be swung in or out of optical path 5″ by means of a hinge 43. Thus, by properly adjusting the axial position of the lens system 40 and by moving the lens 42 either in or out of the optical path, the focal length of the lens system is adjusted so that the image of the characters on the document as "seen" at the photocell 50 may be magnified by different degrees. This provides a simple adjustment for handling different size character fonts. Of further note is the fact that the mirror 44 is included in FIG. 1 merely to fold the optical path for convenient illustration. The presence of mirror 44 is not necessary and may not even be desirable in an actual system.

In operation, the character recognition system as above generally characterized operates as follows: a line of characters on document 1 is illuminated, character by character, as the light transmitting rod 11 makes one pass through the arc 7. Light reflected from the thus serially illuminated portions of the surface of the document is directed by the oscillating mirror 26 to the lenses 40 and 42 where it is properly focused and magnified in order to be analyzed in the photosensing equipment. After a first line of characters has been sensed, the document 1 is moved in the direction of arrow 8 to present the next line of characters for analysis. The photosensing equipment may be arranged to operate during one or both directions of scanning, however it is to be understood that the specific operation of the photosetting equipment is a matter related to the practical requirements of the total system and in no way relates to the present invention.

Referring now to the details of the scanning unit of FIG. 1, together with FIGS. 2 and 3, a detailed description of the structure and operation of the present invention will be given. A frame member 14 is provided with a pair of arms 15 and 16. These arms are journalled about a shaft 18. The shaft 18 is given an oscillating drive motion by any suitable source located to the right (not shown). Frame 14 oscillates about the center line 3 of shaft 18 and is driven by the shaft 18 by means of a positive drive connection consisting of a gear 20, which is pinned to shaft 18, gear 21 and sector gear 22, which are pinned to idler shaft 19, and a sector gear 23 which is rigidly fixed to the arm 16 of the frame. Since there is a two-to-one ratio between the gears 20 and 21, the idler shaft 19 undergoes twice the angular displacement of the oscillating input shaft 18. Since the ratio between gears 22 and 23 is one to one, the frame 14 also oscillates with twice the angular displacement of the shaft 18 and is in phase with that shaft.

Attached to shaft 18 and located between arms 15 and 16 of the member 14 is a mirror support bracket 24. The bracket 24 supports the mirror 26 in such a manner that the reflecting surface of mirror 26 lies in a plane which includes the center line 3 of the shaft 18. The mirror 26 is thus caused to oscillate about that center line in a direct relationship with the shaft 18.

Also integral with the frame 14 are the two support arms 30 extending in a generally upward direction. A cross bar 31 joins the arms 30 at their upper extremity and serves as a holder for the glass rod 11. The rod 11 has a substantially rectangular cross section and is positioned at its lower end adjacent the light source 12 in a slot 17 in the member 14. A clamping bar 32, held in place by a pair of screws 33 (only one of which is shown), serves to secure glass rod 11 in position.

The light source 12 can be any compact high-intensity light source having the ability to withstand several gravities of acceleration. This latter requirement is dictated by the fact that the light source oscillates with frame member 14 and is subjected to acceleration forces both radial and tangential to its path of movement. It can be seen that the tangential acceleration forces at the light source will be highest during the periods of the cycle of oscillation when tangential velocity is equal to zero, i.e., when the frame 14 reverses its angular direction. It has been found that a quartz-iodine lamp of the type used for landing lights in aircraft is ideally suited for the purposes of this invention. That is, the lamp is compact, generates a high-intensity light output which has point source characteristics, and is virtually unaffected by acceleration forces of the size generated in ordinary applications of the present invention. A reflector 28 is positioned beneath the lamp 12 in order to direct a maximum amount of the optical energy generated by the lamp into the lower end of the glass rod 11. Mounting brackets 27 and 29 (see FIG. 2) are used for attaching the lamp 12 and the reflector 28 to the frame 14. Electrical current may be supplied to the lamp by means of, for instance, conductors extending between a pair of leads attached to the frame 14 and an external power supply. Of course, the conductors must be given adequate slackness to allow for the full swing of the frame 14.

The rod 11 may be made of any material that will conduct light energy and is so constructed as to totally internally reflect all light entering through one of its end surfaces. For instance, the rod 11 may be made of glass having highly polished side surfaces. Another way of constructing a totally internally reflective glass rod would be to clad a core of glass with a layer of glass or other transparent material having a lower index of refraction than the core.

Figure 2:
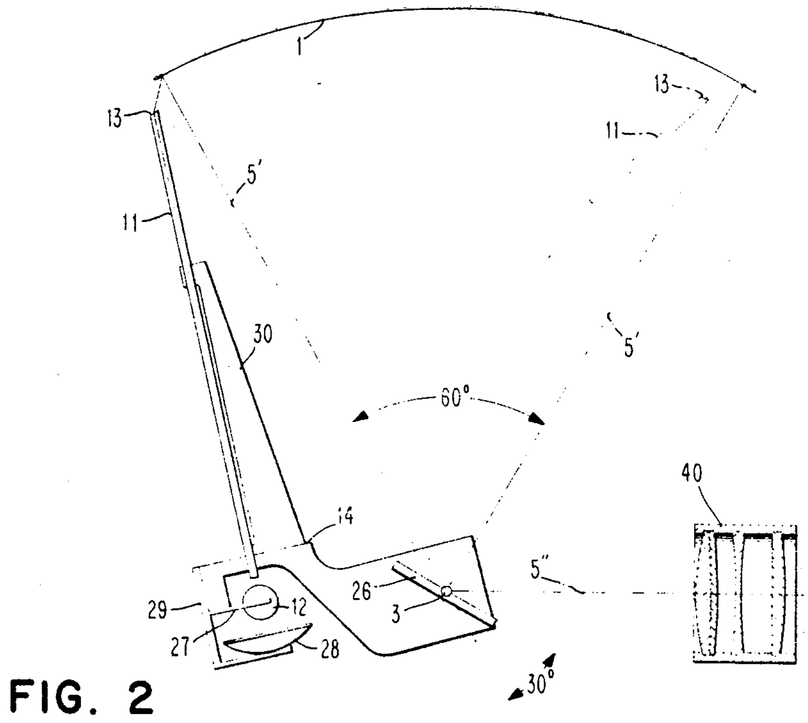
FIG. 2 is a schematic diagram of a part of the apparatus shown in FIG. 1.
Figure 3:
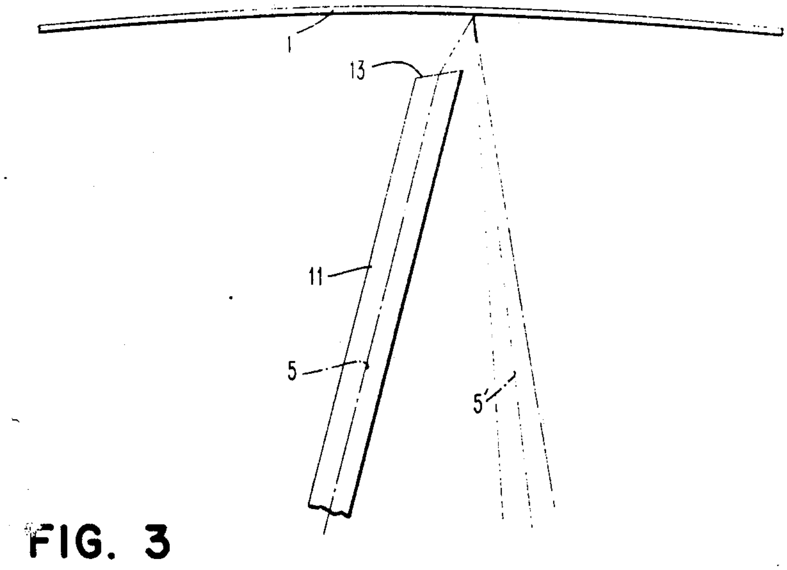
FIG. 3 is a view of the output end of the light channeling means of the invention, showing the reflection of a light ray from the document being scanned.

With reference now to FIG. 2, the operation of the scanning unit 10 of FIG. 1 will be described. As herein shown, the frame 14 is driven through 60 degrees of angular displacement. It is, of course, understood that the degree of angular displacement is determined solely by the practical requirements of the system and 60 degrees is herein chosen only for the sake of clarity of illustration. Because of the gear ratios previously discussed, input shaft 18 is oscillated through 30 degrees in order to effect a 60 degree swing of the frame 14. The mirror 26, being connected to the drive shaft 18, therefore oscillates through 30 degees of displacement. Thus, because the surface of document 1 is supported in a cylindrical plane centered about the centerline 3 of shaft 18 and because of the fixed relationship between the oscillation of the frame 14 and the mirror 26, light reflected from the surface of the document is always directed by the mirror 26 along the path 5''. As a result, the optical distance between the light source 12 and the surface of the document is always constant, as is the optical path from the surface of document to the lenses.

Light passing through end surface 13 of light-channeling rod 11 falls upon a small portion of the surface of the document 1. Because, as shown in FIG. 3, the end surface 13 of the rod 11 is beveled, light passing through the rod will be refracted toward the document as shown. As illustrated in FIG. 3, center ray 5 is off-set from the axis of the rod 11 before it strikes the document. The document's surface diffuses the light and some of the rays are directed toward the mirror along the path 5'.

As previously discussed, the photosensing equipment may be operated during both directions of scan. If, however, it is desired to utilize that equipment during only one-half of the scan cycle, it is preferable to provide the shaft 18 with a quick-return oscillating input. The scanning unit is thus moved as quickly as possible during the time when the sensing equipment is inoperative.

In summary, the novel scanning unit of the present invention is compact and operates with a high degree of efficiency. Intensity of illumination of the document for scanning purposes is at all times constant since the light source 12 is kept at exactly the same distance from the surface of the document during the scan (see FIG. 2). This tends to increase the reliability with which the sensing equipment operates. Additionally, the length of the optical path from document to sensing equipment remains constant throughout the scanning movement.

Of particular significance, however, is the fact that interposed between the light source and the document there are only two refraction surfaces. The use of a scanning mirror is eliminated by moving the light source itself to effect a scan of the document, and the only reflection occurring in the portion of the optical path lying between the source and the document is the extremely efficient total internal reflection occurring in the glass rod 11. Further, as shown in FIG. 2, the light-channeling rod employed in the present invention may be placed extremely close to the light source. The input surface of the rod therefore subtends a large angle relative to the center of the lamp 12. A lens system could not be placed nearly this close to the center of the lamp and therefore, unless it had an undesirably large diameter, could not subtend as large an angle about the center of the lamp. Therefore, a larger percentage of the radiant energy emitted by the lamp enters directly into the light channel. For these reasons, the novel scanning device of the present invention performs with several times the efficiency of known lens-type units.

As a result, less power is required to generate the light energy needed for reliable character recognition. Consequently a much smaller light source, which generates much less heat, may be used and the need for expensive and bulky cooling equipment is substantially reduced, if not entirely eliminated.

While the invention has been particularly shown and described with reference to a preferred embodiment thereof, it will be understood by those skilled in the art that various changes in form and details may be made therein without departing from the spirit and scope of the invention.

We claim:

1. In a scanning device the combination comprising:
support means for supporting a light reflective object to be scanned in a position such that all points on a surface of said object are equidistant from a line having a position fixed in relation to said support means;
a light source;
frame means for holding said light source, said frame means being pivotably mounted about an axis coincident with said line;
light directing means attached to said frame means and adapted to direct a beam of light from said light source to a point of incidence on said surface;
drive means for moving said frame means about said axis to move said point of incidence in a predetermined path perpendicular to said axis across said surface, effecting a scan of said surface whereby portions thereof are successively illuminated in accordance with the path of said scan;
light receiving and sensing means, including a fixed light receiving aperture, adapted to receive and sense light reflected from said surface; and
reflecting means pivotally moved by said drive means about said axis at one-half the angular velocity of said point of incidence whereby light reflected from said successively illuminated portions of said surface is directed to said fixed light receiving aperture along a constant distance path.

2. The scanning device of claim 1 wherein said light directing means comprises a light conducting rod having an input end and an output end, said rod being mounted on said frame means so as to have said input end adjacent said light source and said output end in close proximity to said surface, said output end being beveled so that light emanating therefrom forms said point of incidence at a position on said surface which is spaced from said output end such that the light reflected from said point of incidence travels toward said reflecting means without being deflected by said output end.

3. The scanning device of claim 1 wherein said drive means comprises an oscillating drive shaft geared to said frame means and said reflecting means.

References Cited by the Examiner

UNITED STATES PATENTS

| | | | |
|---|---|---|---|
| 2,071,284 | 2/1937 | Hyland | 88—1 |
| 2,792,448 | 5/1957 | Deuth et al. | 178—7.6 |
| 2,838,683 | 6/1958 | Munro | 88—1 |
| 3,142,224 | 6/1964 | Andrews et al. | 88—1 |

OTHER REFERENCES 551,455 2/1943 Great Britain.

JEWELL H. PEDERSEN, *Primary Examiner.*

JOHN K. CORBIN, *Examiner.*

R. STERN, *Assistant Examiner.*